United States Patent
Bigot et al.

(10) Patent No.: US 8,373,614 B2
(45) Date of Patent: Feb. 12, 2013

(54) DATA VIEWING SYSTEM FOR AN AIRCRAFT

(75) Inventors: Jean-Louis Bigot, Blagnac (FR); Pierre Hauty, Toulouse (FR); Hélène Tribut, Beauzelle (FR); François Pouzolz, Tournefeuille (FR)

(73) Assignee: Airbus Operations SAS, Toulouse (FR)

( * ) Notice: Subject to any disclaimer, the term of this patent is extended or adjusted under 35 U.S.C. 154(b) by 1302 days.

(21) Appl. No.: 11/969,911

(22) Filed: Jan. 6, 2008

(65) Prior Publication Data

US 2008/0174517 A1 Jul. 24, 2008

(30) Foreign Application Priority Data

Jan. 9, 2007 (FR) ...................................... 07 00110

(51) Int. Cl.
- G09G 5/00 (2006.01)
- G01C 23/00 (2006.01)
- G05D 1/00 (2006.01)
- G05D 3/00 (2006.01)
- G06F 7/00 (2006.01)
- G06F 17/00 (2006.01)

(52) U.S. Cl. ............................................ 345/1.1; 701/3
(58) Field of Classification Search ............... 345/1.1–6, 345/73–107, 204–215, 690–699; 701/3–18
See application file for complete search history.

(56) References Cited

U.S. PATENT DOCUMENTS

| | | | | |
|---|---|---|---|---|
| 4,598,292 A * | 7/1986 | Devino | ........................... | 340/973 |
| 4,999,780 A * | 3/1991 | Mitchell | ......................... | 701/16 |
| 5,594,465 A * | 1/1997 | Poulachon | ...................... | 345/98 |
| 5,986,636 A * | 11/1999 | Wu | ................................ | 345/691 |
| 6,072,473 A * | 6/2000 | Muller et al. | ................... | 345/173 |
| 6,112,141 A * | 8/2000 | Briffe et al. | ...................... | 701/14 |
| 6,466,235 B1 * | 10/2002 | Smith et al. | ...................... | 715/771 |
| 6,842,672 B1 * | 1/2005 | Straub et al. | ...................... | 701/3 |
| 6,844,817 B2 * | 1/2005 | Gleine | ........................... | 340/574 |
| 6,915,986 B2 * | 7/2005 | D'Alvia | ...................... | 244/118.5 |
| 7,030,892 B1 * | 4/2006 | Gyde et al. | ...................... | 345/635 |
| 7,307,549 B2 * | 12/2007 | Firra | ................................ | 340/974 |
| 7,538,781 B2 * | 5/2009 | Gyde et al. | ...................... | 345/629 |
| 7,751,948 B2 * | 7/2010 | Boorman et al. | ................. | 701/3 |
| 7,764,198 B2 * | 7/2010 | Brehin et al. | ................. | 340/973 |
| 7,928,863 B2 * | 4/2011 | Firra | ................................ | 340/971 |
| 8,024,760 B2 * | 9/2011 | Dickens et al. | ................. | 725/74 |
| 2002/0120372 A1 * | 8/2002 | Lafon et al. | ...................... | 701/3 |
| 2003/0025719 A1 * | 2/2003 | Palmer et al. | ................. | 345/700 |
| 2006/0066638 A1 * | 3/2006 | Gyde et al. | ...................... | 345/635 |
| 2006/0184253 A1 * | 8/2006 | Andrews et al. | ................. | 700/17 |
| 2006/0212182 A1 * | 9/2006 | Shaw | ............................. | 701/12 |
| 2007/0218428 A1 * | 9/2007 | Taffet | ............................. | 434/41 |
| 2008/0125923 A1 * | 5/2008 | Chesne et al. | .................... | 701/7 |

FOREIGN PATENT DOCUMENTS

| | | |
|---|---|---|
| FR | 2 694 439 | 2/1994 |
| FR | 2 821 446 | 8/2002 |

OTHER PUBLICATIONS

Preliminary Search Report dated Jun. 18, 2007.

* cited by examiner

*Primary Examiner* — Alexander Eisen
*Assistant Examiner* — Patrick F Marinelli
(74) *Attorney, Agent, or Firm* — Dickinson Wright PLLC

(57) ABSTRACT

A data viewing system for an aircraft includes a concentration unit including a first element for acquiring all of the compound images generated by a plurality of image sources, a second element for processing the acquired compound images, and a third element for managing the display of the processed compound images implemented on a plurality of viewing screens.

12 Claims, 1 Drawing Sheet

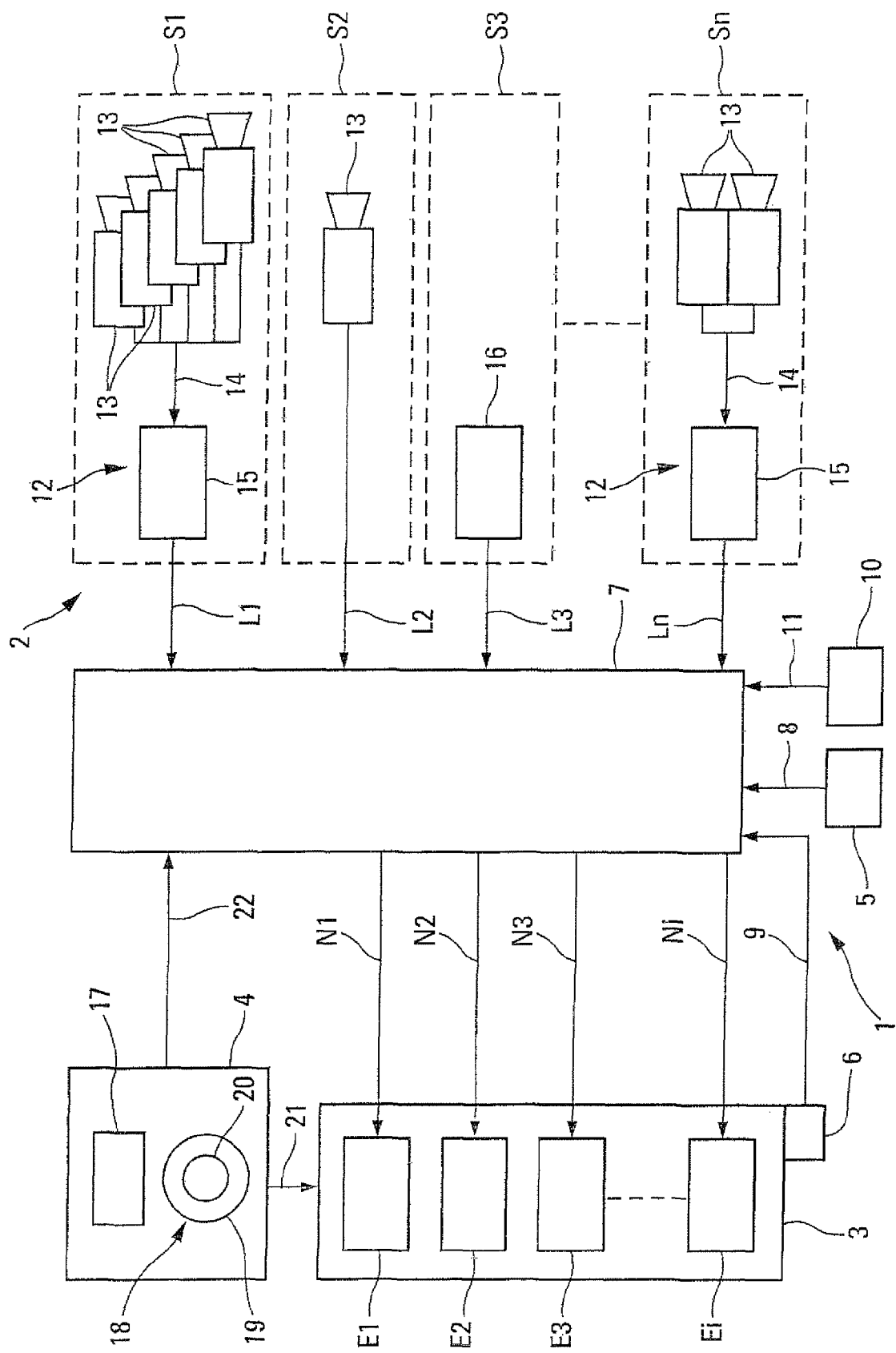

DATA VIEWING SYSTEM FOR AN AIRCRAFT

The present invention relates to a data viewing system for an aircraft, in particular for a transport airplane.

The viewing system is of the type comprising:
- a plurality of image sources generating compound images specified hereinbelow. These image sources are either individual generators of images, or sets comprising a plurality of such image generators and providing at a current instant the images generated by a single of said generators;
- a plurality of viewing screens situated in the flightdeck of the aircraft and suitable for viewing the compound images; and
- control means for said viewing system.

Within the framework of the present invention, said compound images correspond:
- either to data of video type;
- or to data of image type. It is considered that an image type is a format making it possible to display an image comprising text and/or drawings and/or photos, etc.

Consequently the compound images taken into account within the framework of the present invention may either be videos or text or photos for example. They therefore relate to all the data suitable for being displayed currently in the flightdeck of an aircraft.

Moreover it is known that, on a usual viewing system of the aforesaid type, each image source is generally associated with a particular viewing screen. The latter therefore displays only the images generated by the image source associated therewith. For this purpose, in general, each image source/viewing screen pair forms part of a viewing set which additionally comprises a specific computer and specific control means. Said usual viewing system therefore comprises a plurality of such viewing sets which are in general independent.

Now, there currently exists an expanding generalization of the use of compound images by the crew of an aircraft in the monitoring and checking of various systems of the aircraft, in particular:
- in the external monitoring of the aircraft: taxiing, loading, checking of a zone situated around the aircraft, etc.;
- in the internal monitoring of the aircraft: stowage and safety in the hold, safety of the passengers, checking of the entrance door to the flightdeck, etc;
- in other types of monitoring such as, for example, the monitoring of the state of wakefulness of the crew by checking the movement of an eye, etc.

This ever growing number of image sources to be managed gives rise to a considerable number of problems to be solved, in particular:
- an increase in the number of commands, which is incompatible in particular with the room available in the flightdeck and the ergonomics concepts generally advocated;
- an increase in the number of very different compound images that are to be viewed on one and the same dedicated viewing screen;
- an increase in the number of physical inputs, which is incompatible with the sizes of the connectors used;
- an increase in the calculation power, which is incompatible with that available in the viewing screens;
- a diversity of formats of the various compound images used, thereby involving additional adaptations of the viewing screens, which additional adaptations are incompatible with the processing capacities of the computers used;
- a rise in the complexity of managing these compound images, as a function in particular of the viewing screens and of their possible reconfiguration;
- the need to manage a large number of system configurations (option installed or otherwise on the aircraft) and of various definitions of the associated control means or panels.

The present invention relates to a data viewing system for an aircraft, the object of which is to remedy the aforesaid drawbacks.

To this end, according to the invention, said viewing system of the type comprising:
- a plurality of image sources generating compound images corresponding to data of video type and/or data of image type;
- a plurality of viewing screens suitable for viewing the compound images; and
- control means for said viewing system, is noteworthy in that it moreover comprises:
- first means for determining the current values of parameters of the aircraft, such as altitude or attitude for example;
- second means for detecting any anomaly relating to at least one of said viewing screens;
- a single concentration means, which is connected at one and the same time to all said image sources, to all said viewing screens, to said first means and to said second means, and which comprises:
  - an element for acquiring all the compound images generated by said image sources;
  - an element for processing these compound images in such a way as to render them compatible with display formats of said viewing screens;
  - an element for managing the display implemented on all said viewing screens, which is such that any of said compound images may be viewed on any of said viewing screens; and
  - a selection element for automatically selecting at least one compound image generated by one of said image sources, as well as an associated viewing screen, as a function at one and the same time of integrated display logic, said current values of parameters of the aircraft, determined by said first means, and as appropriate an anomaly pertaining to at least one of said viewing screens and signaled by said second means.

Thus, by virtue of said concentration means the viewing system in accordance with the invention comprises a single means for acquiring and processing all the compound images generated by the various image sources and for managing the display implemented on the various viewing screens. Moreover, according to the invention, this management is such that any of the various compound images generated (by one of said image sources) can be viewed on any of the various viewing screens of said viewing system.

Furthermore, by virtue of said integrated selection element, the concentration means automatically selects a particular compound image, namely the image which it is important to present to the pilot at the present instant (depending on the present or current state of the aircraft which is illustrated by the current values of the aforesaid parameters), as specified hereinbelow, thereby making it possible in particular to reduce the workload of the pilot.

In a preferred embodiment,
said viewing system furthermore comprises third means which are suitable for detecting a selection cue signaling the need to view a particular compound image. This selection cue may be the detecting of an anomaly by a particular sensor, signaling for example abnormal heating in the hold and advocating the display of a video image of this hold, or the reception of a particular message, emitted for example by the cabin staff and requiring the display of a particular compound image; and said selection element for said concentration means carries out the selection of said particular compound image (and of the associated viewing screen) as soon as said selection cue is detected by said third means.

In a first embodiment (or automatic mode), said concentration means comprises an element (integrated) which is formed in such a way as to automatically control the displaying, on the associated viewing screen, of any compound image selected by said selection element, and to do so as soon as the compound image has been selected.

Thus by virtue of this first embodiment of the invention, the compound image which is to be presented to the pilot of the aircraft is not only selected automatically, but also displayed automatically (and is so as soon as it is selected). This display does not therefore require any pilot action.

Furthermore, in a second embodiment (or preselection mode):

said system furthermore comprises an actuation means suitable for being actuated by an operator; and said concentration means comprises an element (integrated) which is formed in such a way as to control the displaying, on the associated viewing screen, of a compound image selected by said selection element, only at the time said actuation means is actuated by the operator and to do so as soon as this actuation takes place.

The calculation principle used in this second embodiment (or preselection mode) is identical to that of the first embodiment (or automatic mode) specified above, except for the fact that there is no immediate requirement for the operator to take account of the compound image, so that said operator is not needlessly overloaded. This preselection mode therefore selects the most relevant data item to be presented to an operator, in particular to the pilot of the aircraft. Moreover, as soon as the latter actuates said actuation means, in particular a button for triggering a video mode, the compound image selected is displayed on an associated viewing screen. Thus, the workload of the operator is decreased by presenting, when requested thereby, the most relevant compound image as a function of the current state of the aircraft.

Moreover, in a particular embodiment, said viewing system moreover comprises means of manual selection allowing an operator to select and control manually at any moment, in a manual mode, the displaying of a particular compound image on a particular viewing screen. Thus, it is possible for an operator, in particular the pilot of the aircraft, to request at any moment, in a manual manner, a particular display. Preferably, said viewing system is formed in such a way as to return automatically to an automatic selection of a compound image (as specified above) as soon as such a manual mode is exited.

In a preferred embodiment, said means of manual selection comprise:

a first actuatable element making it possible to select an image source; and a second actuatable element making it possible to select, for an image source comprising a plurality of image generators, the compound image generated by one of said image generators.

In this case, preferably, said first element comprises a first rotator and said second element comprises a second rotator, said first and second rotators are mounted one on the other in a co-axial manner and in such a way as to be able to be actuated individually, and they cooperate with at least one interactive zone provided on at least one of said viewing screens.

Additionally, in a particular embodiment, said viewing system furthermore comprises:

a means of reconfiguring the display carried out by said viewing screens; and/or an anti-piracy device which makes it possible to do away with all or some of a video monitoring and to reorient toward systems provided for this purpose all or some of the compound images available on the aircraft.

The single FIGURE of the appended drawing will elucidate the manner in which the invention may be embodied. This single FIGURE is the schematic diagram of a viewing system in accordance with the invention.

The system 1 in accordance with the invention and represented schematically in the FIGURE is intended for viewing data of an aircraft, for example of a transport airplane, not represented.

More precisely, this viewing system 1 is intended for presenting compound images which correspond, within the framework of the present invention:

either to data of video type which are compatible with the various video formats commonly used, for example a usual format of SMPTE type;

or to data of image type. It is considered that an image type is a format making it possible to display an image comprising text and/or drawings and/or photos, etc. This may for example be a usual DVI format which is used by office computers.

Consequently, the compound images taken into account within the framework of the present invention may either be videos or text or photos. They therefore relate to all the data suitable for being displayed currently in the flightdeck of an aircraft.

Said viewing system 1 is of the type comprising:

a set 2 of image sources S1, S2, S3, ..., Sn, n being an integer greater than 1. Each of these image sources specified hereinbelow is able to generate compound images as specified above;

a display device 3 which is installed in the flightdeck of the aircraft and which comprises a plurality of viewing screens E1, E2, E3, ..., Ei, i being an integer greater than 1. These viewing screens E1 to Ei are suitable for viewing compound images; and control means 4 for said viewing system 1.

According to the invention, said viewing system 1 moreover comprises:

means 5 which are suitable for determining, in real time, the current values of various parameters of the aircraft, which make it possible to deduce the current state of said aircraft, as specified hereinbelow;

means 6 which are suitable for detecting any anomaly relating to at least one of said viewing screens of said display device 3; and a single concentration means 7 which is connected:

by way of links L1 to Ln respectively to said image sources S1 to Sn;

by way of links N1 to Ni respectively to said viewing screens E1 to Ei;

by way of a link 8 to said means 5; and by way of a link 9 to said means 6.

According to the invention, this single concentration means 7 comprises the following integrated elements, not represented specifically in the FIGURE:

an element for acquiring all the compound images generated by said image sources S1 to Sn;

an element for processing these compound images in such a way as to render them compatible with display formats of said viewing screens E1 to Ei;

an element for managing the display implemented on all said viewing screens E1 to Ei. According to the invention, this display must be such that any of said compound images can be viewed on any of said viewing screens; and a selection element for automatically selecting at least one compound image generated by one of said image sources S1 to Sn, as well as an associated viewing screen. Said selection element carries out this automatic selection as a function at one and the same time of integrated display logic specified hereinbelow, of said current values of parameters of the aircraft, determined by said means 5, and as appropriate an anomaly pertaining to at least one of said viewing screens E1 to Ei and signaled by said means 6.

This concentration means 7 therefore concentrates all the information that will have to be viewed originating from the image sources S1 to Si, and it also groups together the user commands, as well as the parameters on the state of the aircraft and its environment, which are necessary for the automatic management of this information.

As far as the means 5 are concerned, they determine the current values of parameters of the aircraft which make it possible to illustrate its current state. These parameters may for example relate to the following information: engine on/off, flight phase, altitude, state of systems (does there already exist a more important item of information displayed on a relevant screen with respect to that which is required to be displayed?), etc.

Furthermore, said means 6 indicate in particular whether a relevant viewing screen is or is not operational, or else whether it is or is not necessary to carry out a reconfiguration of this viewing screen.

In a preferred embodiment:

said viewing system 1 furthermore comprises means 10 which are connected by way of a link 11 to said concentration means 7 and which are formed in such a way as to detect a selection cue signaling the need to view a particular compound image. This selection cue may be the detecting of an anomaly by a particular sensor, signaling for example abnormal heating in the hold and advocating the display of a video image of this hold, or the reception of a particular message, emitted for example by the cabin staff and requiring the display of a particular compound image; and said selection element for said concentration means 7 carries out the selection of said particular compound image (and of the associated viewing screen) as soon as said selection cue is detected by said means 10.

Consequently, by virtue of the concentration means 7, the viewing system 1 in accordance with the invention comprises a single means for acquiring and processing all the compound images generated by the various image sources S1 to Sn and for managing the display implemented on the various viewing screens E1 to Ei. Moreover, according to the invention, this management is such that any of the various compound images generated (by one of said image sources S1 to Sn) may be viewed on any of the various viewing screens E1 to Ei of said display device 3.

Furthermore, by virtue of said integrated selection element, said concentration means 7 automatically selects a particular compound image, namely the image which it is important to present to the pilot at the present instant (as a function of the present or current state of the aircraft, which state is illustrated by the current values of the aforesaid parameters), thereby making it possible in particular to reduce the workload of the pilot.

Within the framework of the present invention, an image source S1 to Sn may comprise:

a single video generator 13, in particular a video camera, generating data of video type as represented for the image source S2; or a set 12 comprising a plurality of such video generators 13 which are connected by way of a link 14 to a means 15 which concentrates the images received from these various video generators 13 and which carries out the selection of one of said images and transmits it to said concentration means 7, as represented for the image sources S1 and Sn; or a generator 16 of data of image type, that is to say a generator generating text, photos, drawings, etc., as represented for the image source S3.

In a first embodiment corresponding to an automatic mode, said concentration means 7 comprises an integrated element (not represented) which is formed in such a way as to automatically control the display, on the associated viewing screen, of any compound image selected by said selection element, and to do so as soon as this compound image is selected.

Thus, by virtue of this first embodiment of the invention, the compound image which is to be presented to the pilot of the aircraft is not only selected automatically, but also displayed automatically (and is so as soon as it is selected). This display does not therefore require any pilot action.

In this automatic mode, as soon as the aircraft is powered electrically, the concentration means 7 of the viewing system 1 analyzes the parameters which are received from means 5 and which describe the current state of the aircraft [on the ground (engine on or otherwise), phase (taxiing, takeoff phase, cruising, etc.), altitude, etc.]. Said concentration means 7 analyzes in parallel the information transmitted by the image sources S1 to Sn and by the means 10. If as a function of this information, a particular compound image must be taken into account immediately by the pilot of the aircraft, the concentration means 7 selects and displays automatically this compound image (if necessary after having shaped it) on a dedicated screen of the display device 3. By way of illustration, said concentration means 7 may use, for this purpose, the following integrated display logic:

information of system type (for example a video of the hold) is routed to a system screen of SD type ("System Display");

information of airport map type are routed to a navigation screen of ND type ("Navigation Display"); and information pertaining to an image external to the aircraft are routed to primary piloting screen of PFD type ("Primary Flight Display").

These various screens SD, ND and PFD, as well as for example a multifunction screen of MFD tape ("Multi Function Display"), form of course part of said display device 3 and correspond to certain of said viewing screens E1 to Ei.

An exemplary process implemented in the automatic mode is now described. In this example, no image arising from the concentration means 7 is displayed on the display device 3 and the aircraft is in flight. During the flight, a detection cue, originating from the cargo system and detected by the means 10, requests the displaying of video of the rear right cargo zone. In this case, the concentration means 7 responds successively (automatically) to the following questions, and it automatically carries out the displaying of said cargo zone only in the event of a positive response to all these questions:

is the request valid? (that is to say in the current configuration of the aircraft, is the cargo system installed and is it valid?);

if it is, does this request have priority? (that is to say are there or are there not other requests of the systems connected to the concentration means 7 and if so with what priority?);

if there are, is this request compatible with the current phase of the aircraft? (specifically, to display this item of information, the aircraft must be in a phase which permits this request);

if it is, can the display be carried out on a particular screen Ej? (that is to say on which screen of the flightdeck must this cue be displayed or else should the reconfigurations be tracked?).

Consequently, if all the above questions have a positive response, the concentration means 7 automatically demands the displaying of the video of the cargo zone on the particular viewing screen Ej specified above, j being an integer lying between 1 and i.

Additionally, in a second embodiment pertaining to a preselection (semiautomatic mode):

said viewing system 1 comprises, moreover, at least one actuation means 17 specified hereinbelow and suitable for being actuated by an operator. This actuation means 17 forms for example part of the control means 4 which are connected by way of links 21 and 22 respectively to said display device 3 and to said concentration means 7;

said concentration means 7 comprises an integrated element (not represented) which is formed in such a way as to control the display, on the associated viewing screen, of a compound image selected by said selection element, and to do so as soon as said actuation means 17 is actuated by the operator.

The calculation principle used in this second embodiment (or preselection mode) is identical to that of the first embodiment (or automatic mode) specified above, except for the fact that there is no immediate requirement for the operator to take account of the display, so that said operator is not needlessly overloaded. This preselection mode therefore selects the most relevant data item to be presented to an operator, in particular to the pilot of the aircraft. Moreover, as soon as the latter actuates said actuation means 17, in particular a button for triggering a video mode or a button for triggering a particular display mode, the compound image selected is displayed on the associated viewing screen. Thus, the workload of the operator is decreased by presenting, when requested thereby, (which is done by actuating the actuation means 17) the most relevant compound image as a function of the current state of the aircraft.

Additionally, in a particular embodiment, said viewing system 1 furthermore comprises means of manual selection 18 making it possible at any moment for an operator to select and control manually, in a manual mode which has priority, the displaying of a particular compound image on a particular viewing screen of said display device 3. Thus, it is possible for an operator, in particular the pilot of the aircraft, to request at any moment, manually, a particular display.

Furthermore, said viewing system 1 is moreover formed in such a way as to return automatically, as soon as such a manual mode is exited, to an automatic selection of a compound image (as specified above) corresponding to the aforesaid automatic mode or to the aforesaid semi-automatic preselection mode.

In a preferred embodiment, said means of manual selection 18 comprise:

an actuatable element 19 making it possible to select an image source with a return of order via an interactive menu which is displayed on at least one of said viewing screens E1 to Ei of said display device 3; and an actuatable element 20 making it possible to select, for an image source S1 or Sn comprising a plurality of video generators 13, the compound image generated by one of said video generators 13, with a return of order via a (interactive) flowchart included in the compound image displayed.

In this case, preferably, said elements 19 and 20 are rotactors which are mounted one on the other in a co-axial manner, the rotator 20 of reduced size preferably being arranged on the rotator 19. These rotators 19 and 20 may be actuated separately, and they cooperate with at least one interactive zone provided on at least one of said viewing screens E1 to Ei.

Consequently, the rotator 19 makes it possible to select the displayable image source S1, S2, Sn. It will be noted that if a function implementing the aforesaid preselection mode is available, then pressing the actuation means 17 causes the automatic displaying of a preselected compound image. The displaying of a compound image is accompanied by the displaying of a control menu for the image source presented and for the activatable image sources. For this purpose, the display device 3 presents for example, on the viewing screen on which the selected image is viewed various tabs, and in particular:

a tab exhibiting a first color, for example green, which indicates the image source which is currently displayed, for example source S1; and tabs exhibiting a second color, for example white, which are situated in the background so as to indicate the other image sources available for display, for example the sources S2 to Sn.

The color indicates the tab which is active. Moreover, an abbreviation is provided which gives the name of the image source.

Consequently, by using the bottom rotator 19 (choice of first level), an operator can change image source. Selection thereof is confirmed via the progression through the tabs [active tab in the foreground associated with its change of color (green active)].

If there are several selectable video generators 13 for the image source thus selected, for example the source S1, a flowchart included in the video shows the various zones of the cargo that the operator can choose as a function of the positioning of these video generators 13. To do this, he uses the top rotator 20 (choice of second level) to display the image generator 13 of the zone which he wishes to watch in accordance with a schematic displayed on the image displayed. This schematic is animated as a function of this second-level command, so as to allow the operator to view his selection and the other possible selections.

Additionally, in a particular embodiment, said viewing system 1 furthermore comprises an integrated anti-piracy device (not represented) which makes it possible either by operator action, or by an action outside the aircraft, to do away with all or some of a video monitoring and to reorient to systems provided for this purpose, all or some of the video streams available on the aircraft.

Additionally, the viewing system 1 in accordance with the invention can operate, either in a normal mode, or in a reconfiguration mode.

In the normal mode, the viewing system 1 displays the video page selected on the dedicated viewing screen of the display device 3. It can simultaneously display several videos of various sizes and/or with various arrangements, for example in the form of a mosaic with several videos displayed in one and the same location.

Furthermore, in the reconfiguration mode, the viewing system 1 can reassign one or more images onto one or more other viewing screens following a request from the crew or following an automatic transfer (for example because of a fault with the viewing screen). The viewing system 1 is also capable of tracking these changes of screen assignments so as to enable the information presented to be kept homogenous before and after one or more reconfigurations. Moreover, said viewing system 1 is formed in such a way as to automatically limit the number of displayable videos as a function of the number of reconfigurations, so as to automatically allow the operator the compound images of highest priority as a function of the number of operational screens.

Furthermore, in a particular embodiment, said viewing system 1 can also be formed in such a way as to automatically withdraw a displayed image, and to do so as a function of external parameters, for example when the image is no longer of interest. This automatically lightens the crew's load and makes relevant information available to them at the proper time without manual intervention.

Consequently, the viewing system 1 in accordance with the invention, and in particular the concentration means 7, implement the following functions:
- concentrate all the data at the input of the concentration means 7 which shapes the data streams, so as to render them compatible with the format required by the viewing screens E1 to Ei of the display device 3 and to manage the display of the multiple image sources S1 to Sn on the viewing screens E1 to Ei, taking account of the reconfigurations which may intervene on these same viewing screens;
- accommodate diverse protocols and formats (video, data, etc.) so as to transform them into an aircraft compatible standard, but also to shape them so that they are compatible with the shapes of the viewing screens E1 to Ei on which they will be displayed;
- take account of the additional information pertaining to the aircraft (flight phase, sensor, crew action, etc) so as to integrate it into the display and reconfiguration tracking logic if necessary;
- for automatic management, develop a mechanism for automatic triggering of display that is integrated into the management, reconfiguration and priority logic facilities of the viewing system 1, both in an automatic display mode and in a preselection (semi-automatic) mode; and
- for manual management:
  - develop a generic management mechanism making it possible to select the image source S1 to Sn from a first level, then the desired video generator 13 (for the image sources S1 to Sn comprising a plurality of video generators 13) from a second level, with the aid of common commands and interactive menus;
  - centralize and decrease the number of commands, by associating them with logic facilities so as to define priorities and to manage calls, so as to automatically propose the most relevant compound image as a function of the flight phase or of the appearance of an external request;
  - use interactivity functions to access the whole set of compound images available; and
  - return automatically to an automatic management mode as soon as the manual mode is exited.

The invention claimed is:

1. A data viewing system for an aircraft, said data viewing system comprising:
    a plurality of image sources for generating compound images corresponding to at least one of data of video type and data of image type;
    a first unit for determining current values of parameters of the aircraft;
    a plurality of viewing screens configured to display the compound images;
    a second unit for detecting an anomaly of at least one of said viewing screens;
    a single concentration unit connected to each of said plurality of image sources, said plurality of viewing screens, said first unit, and said second unit;
    wherein said single concentration unit comprises:
        a) a first element configured to acquire each of the compound images generated by said plurality of image sources;
        b) a second element configured to process each of the acquired compound images for compatibility with display formats of said plurality of viewing screens;
        c) a third element configured to manage the display of the compound images of said plurality of viewing screens processed by said second element; and
        d) a selection element configured to select at least one of said compound images generated by one of said image sources, and to select an associated viewing screen on which to display the selected at least one compound image, as a function of an integrated display logic, said current values of parameters of the aircraft determined by said first unit, and the anomaly detected by said second unit, with the integrated display logic being defined as routing to the plurality of screens based on aircraft system information, airport information and external aircraft image information;
    wherein the signal concentration unit is further configured to:
    transform and shape diverse protocols and formats for compatibility with said viewing screens; and
    integrate said current values of parameters of the aircraft into the integrated display logic; and
    wherein a control unit is connected to said single concentration unit and said plurality of viewing screens for controlling the data viewing system.

2. The data viewing system as claimed in claim 1, wherein:
    said data viewing system further comprises a third unit configured to detect a selection cue according to an anomaly of a sensor; and
    said selection element of said concentration unit is further configured to carry out the selection of said at least one compound image and the associated viewing screen on which to display the at least one compound image, as soon as said selection cue is detected by said third unit.

3. The data viewing system as claimed in claim 1, wherein said concentration unit further comprises an integrated element configured to control the display, on the associated viewing screen, of the at least one compound image selected by said selection element as soon as the at least one compound image is selected.

4. The data viewing system as claimed in claim 1, wherein:
    said control unit comprises an actuation unit configured for actuation by an operator; and
    said concentration unit is further configured to display the at least one compound image selected by said selection element on the associated viewing screen, as soon as said actuation unit is actuated by the operator according to a preselection mode.

5. The data viewing system as claimed in claim 1, wherein the control unit comprises a manual selection unit configured for an operator to select and control, in a manual mode, the display of at least one compound image on a particular viewing screen of the plurality of viewing screens.

6. The data viewing system as claimed in claim 5, wherein the data viewing system is further configured to return to an automatic selection mode as soon as the manual mode is exited.

7. The data viewing system as claimed in claim 5, wherein said manual selection unit comprises:
   a first actuatable element configured to select a first image source of the image sources; and
   a second actuatable element configured to select a second image source of the image sources, said second image source comprising a plurality of image generators.

8. The data viewing system as claimed in claim 7, wherein said first actuatable element comprises a first rotator and said second element comprises a second rotator and wherein said first rotator and said second rotator are mounted in a co-axial manner and are configured for individual actuation, and said first rotator and said second rotator cooperate with at least one interactive zone provided on at least one of said viewing screens.

9. The data viewing system as claimed in claim 1, wherein said data viewing system further comprises a display reconfiguring unit for reconfiguring the display of said viewing screens.

10. The data viewing system as claimed in claim 1, wherein said data viewing system further comprises an anti-piracy device.

11. An aircraft, which comprises a data viewing system such as that specified under claim 1.

12. A data viewing system for an aircraft, said data viewing system comprising:
   a plurality of image sources for generating compound images corresponding to at least one of data of video type and data of image type;
   a first unit for determining current values of parameters of the aircraft;
   a plurality of viewing screens configured to display the compound images;
   a second unit for detecting an anomaly of at least one of said viewing screens;
   a single concentration unit connected to each of said plurality of image sources, said plurality of viewing screens, said first unit, and said second unit;
   wherein said single concentration unit comprises:
      a) a first element configured to acquire each of the compound images generated by said plurality of image sources;
      b) a second element configured to process each of the acquired compound images for compatibility with display formats of said plurality of viewing screens;
      c) a third element configured to manage the display of the compound images of said plurality of viewing screens processed by said second element; and
      d) a selection element configured to select at least one of said compound images generated by one of said image sources, and to select an associated viewing screen on which to display the selected at least one compound image, as a function of an integrated display logic, said current values of parameters of the aircraft determined by said first unit, and the anomaly detected by said second unit, with the integrated display logic being defined as routing to the plurality of screens based on aircraft system information, airport information and external aircraft image information;
   wherein the data viewing system further comprises a manual selection unit configured for an operator to select and control, in a manual mode, the display of at least one compound image on a particular viewing screen of the plurality of viewing screens;
   wherein said manual selection unit comprises:
   a first actuatable element configured to select a first image source of the image sources; and
   a second actuatable element configured to select a second image source of the image sources, said second image source comprising a plurality of image generators;
   wherein said first actuatable element comprises a first rotator and said second element comprises a second rotator;
   wherein said first rotator and said second rotator are mounted in a co-axial manner and are configured for individual actuation, and said first rotator and said second rotator cooperate with at least one interactive zone provided on at least one of said viewing screens.

* * * * *